US009008359B2

(12) United States Patent
Feris et al.

(10) Patent No.: US 9,008,359 B2
(45) Date of Patent: Apr. 14, 2015

(54) DETECTION OF STATIC OBJECT ON THOROUGHFARE CROSSINGS

(75) Inventors: Rogerio S. Feris, White Plains, NY (US); Yun Zhai, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 13/535,461

(22) Filed: Jun. 28, 2012

(65) Prior Publication Data

US 2014/0003724 A1    Jan. 2, 2014

(51) Int. Cl.
*G06K 9/00* (2006.01)
*G06T 7/20* (2006.01)

(52) U.S. Cl.
CPC .......... *G06T 7/2053* (2013.01); *G06K 9/00805* (2013.01)

(58) Field of Classification Search
CPC ... G06T 7/2053; G06T 7/2073; G06T 7/2086; G06T 7/2066; G06T 2207/30236; G06T 2207/30232; G06K 9/00805
USPC .................. 382/197, 103, 104, 105, 106, 107
See application file for complete search history.

(56) References Cited

U.S. PATENT DOCUMENTS

| | | | |
|---|---|---|---|
| 6,546,118 B1 * | 4/2003 | Iisaka et al. | 382/104 |
| 2008/0199050 A1 * | 8/2008 | Koitabashi | 382/107 |
| 2010/0246886 A1 * | 9/2010 | Nakamura et al. | 382/103 |

FOREIGN PATENT DOCUMENTS

| | | |
|---|---|---|
| CN | 101179710 B | 12/2010 |
| WO | WO2008131569 A1 | 11/2008 |

OTHER PUBLICATIONS

Yaser Sheikh et al, Visual Monitoring of Railroad Grade Crossing, SPIE Conference, Orlando, USA, Apr. 13-15, 2004, 7 pp.
Siemens AG, Block-Based Temporal Analysis of Video Segments to Detect Moving and Stationary Vehicles, IPCOM000133051D, IP.com, 4 pp, Feb. 10, 2006.
Masaru Ohta, Level Crossings Obstacle Detection System Using Stereo Cameras, Japan, QR of RTRI, vol. 46, No. 2, Jun. 2005, pp. 110-117.
N. Fakhfakh et al, A Video-Based Object Detection System for Improving Safety at Level Crossings, The Open Transportation Journal, 2011, pp. 45-59.

* cited by examiner

*Primary Examiner* — Brian Le
(74) *Attorney, Agent, or Firm* — Patrick J. Daugherty; Driggs, Hogg, Daugherty & Del Zoppo Co., LPA (57) ABSTRACT

Foreground object image features are extracted from input video via application of a background subtraction mask, and optical flow image features from a region of the input video image data defined by the extracted foreground object image features. If estimated movement features indicate that the underlying object is in motion, a dominant moving direction of the underlying object is determined. If the dominant moving direction is parallel to an orientation of the second, crossed thoroughfare, an event alarm indicating that a static object is blocking travel on the crossing second thoroughfare is not generated. If the estimated movement features indicate that the underlying object is static, or that its determined dominant moving direction is not parallel to the second thoroughfare, an appearance of the foreground object region is determined and a static-ness timer run while the foreground object region comprises the extracted foreground object image features.

20 Claims, 3 Drawing Sheets

DETECTION OF STATIC OBJECT ON THOROUGHFARE CROSSINGS

FIELD OF THE INVENTION

Embodiments of the present invention relate to applying computer vision techniques to automatically detect the presence of static objects within thoroughfare crossings, including level-grade roadway crossings over railroad tracks.

BACKGROUND

Level-grade crossings, the intersections of railroad railways with vehicle roadways and pedestrian walkways, present safety problems. Moving railroad trains possess a large amount of inertia and usually require large amounts of travel distance to be brought to a stop. Disabled vehicles on the rail tracks and other stationary objects abandoned on the level crossings pose serious traffic safety threats, and accidents caused by collisions of moving railroad trains with such objects frequently result in significant loss of life and property. Typically, by the time a train engineer recognizes that an object on a level crossing is static and will collide with the moving train, it is too late to take action and bring the train to a stop to avoid the collision.

Accordingly, a variety of automated alarm systems are proposed or implemented in order to determine collision hazards caused by static objects located within such level-grade crossings. Such systems may provide warnings to train operators or other parties remote from the crossing that are early enough to enable avoidance measures, such as sending personnel to the crossing to remove the object, or notifying a train engineer to begin stopping the train early enough so that the train will stop prior to entry of the crossing. However, such early warning systems suffer from a variety of limitations. For example, the capabilities of such systems may be limited by reliance on human perception to review video feeds of crossings and make the necessary determinations to spot and abate problems. The number of personnel available to watch video footage from vast camera arrays is generally limited by budgetary and other resource limitations, as is the ability of any one human monitor to perceive a threat in a given video feed. The process of watching surveillance videos is resource consuming, suffers from high costs of employing security personnel, and efficiency in such systems to detect events of interest is also limited by the constraints of human comprehension.

The field of intelligent visual surveillance seeks to address this problem by applying computer vision techniques to automatically detect specific static objects present on the railway and visible in the video streams. However, the efficacy of such systems in real-world conditions is limited, and high rates of false positive detections or low rates of accuracy in detecting true events may limit the usefulness and trustworthiness of such systems.

BRIEF SUMMARY

In one embodiment of the present invention, a method applies computer vision techniques to input video image data from a scene of a level-grade crossing of a first thoroughfare by a second thoroughfare to automatically detect the presence of static objects within a first thoroughfare crossing of a second thoroughfare. More particularly, a processing unit extracts and records into a tangible data storage medium foreground object image features via application of a background subtraction mask, and optical flow image features from a region of the input video image data defined by the extracted foreground object image features. The processing unit determines whether an underlying object of the extracted foreground object image features is in motion or is static by estimating movement features of the foreground object image features. If the estimated movement features indicate that the underlying object is in motion, then the processing unit determines a dominant moving direction of the underlying object as a function of the extracted optical flow image features. If the determined dominant moving direction of the underlying object is parallel to an orientation of the second thoroughfare that is crossed by the first thoroughfare, the process is reset and an event alarm that indicates that a static object is blocking travel on the crossing second thoroughfare is not generated. If the estimated movement features indicate that the underlying object is static, or that the object is in motion and has a determined dominant moving direction of the underlying object that is not parallel to the orientation of the second thoroughfare, then an initial appearance of the foreground object region is determined and a static-ness timer started and run, wherein the timer runs while the foreground object region comprises the extracted foreground object image features. Accordingly, the event alarm is generated if the started static-ness timer reaches a threshold while the determined appearance of the foreground object region comprises the extracted foreground object image features.

In another embodiment, a system has a processing unit, computer readable memory and a tangible computer-readable storage medium with program instructions, wherein the processing unit, when executing the stored program instructions, applies computer vision techniques to input video image data from a scene of a level-grade crossing of a first thoroughfare by a second thoroughfare to automatically detect the presence of static objects within a first thoroughfare crossing of a second thoroughfare. More particularly, the processing unit extracts and records foreground object image features into a tangible data storage medium via application of a background subtraction mask, and optical flow image features from a region of the input video image data defined by the extracted foreground object image features. The processing unit determines whether an underlying object of the extracted foreground object image features is in motion or is static by estimating movement features of the foreground object image features. If the estimated movement features indicate that the underlying object is in motion, then the processing unit determines a dominant moving direction of the underlying object as a function of the extracted optical flow image features. If the determined dominant moving direction of the underlying object is parallel to an orientation of the second thoroughfare that is crossed by the first thoroughfare, the process is reset and an event alarm that indicates that a static object is blocking travel on the crossing second thoroughfare is not generated. If the estimated movement features indicate that the underlying object is static, or that the object is in motion and has a determined dominant moving direction of the underlying object that is not parallel to the orientation of the second thoroughfare, then an initial appearance of the foreground object region is determined and a static-ness timer started and run, wherein the timer runs while the foreground object region comprises the extracted foreground object image features. Accordingly, the event alarm is generated if the started static-ness timer reaches a threshold while the determined appearance of the foreground object region comprises the extracted foreground object image features.

In another embodiment, an article of manufacture has a tangible computer-readable storage medium with computer readable program code embodied therewith, the computer readable program code comprising instructions that, when executed by a computer processing unit, cause the computer processing unit to apply computer vision techniques to input video image data from a scene of a level-grade crossing of a first thoroughfare by a second thoroughfare to automatically detect the presence of static objects within a first thoroughfare crossing of a second thoroughfare. More particularly, the processing unit extracts and records foreground object image features into a tangible data storage medium via application of a background subtraction mask, and optical flow image features from a region of the input video image data defined by the extracted foreground object image features. The processing unit determines whether an underlying object of the extracted foreground object image features is in motion or is static by estimating movement features of the foreground object image features. If the estimated movement features indicate that the underlying object is in motion, then the processing unit determines a dominant moving direction of the underlying object as a function of the extracted optical flow image features. If the determined dominant moving direction of the underlying object is parallel to an orientation of the second thoroughfare that is crossed by the first thoroughfare, the process is reset and an event alarm that indicates that a static object is blocking travel on the crossing second thoroughfare is not generated. If the estimated movement features indicate that the underlying object is static, or that the object is in motion and has a determined dominant moving direction of the underlying object that is not parallel to the orientation of the second thoroughfare, then an initial appearance of the foreground object region is determined and a static-ness timer started and run, wherein the timer runs while the foreground object region comprises the extracted foreground object image features. Accordingly; the event alarm is generated if the started static-ness timer reaches a threshold while the determined appearance of the foreground object region comprises the extracted foreground object image features.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Intelligent visual surveillance comprehends applying computer vision techniques to automatically detect specific events in video stream data, such as detecting static or moving objects crossing a railway in a level-grade crossing scene. However, railway crossing environments present a number of challenges to automated video monitoring implementations. For example, some prior art approaches use background modeling for direct object detection and tracking processes, such as by setting up a motion detection alert or tripwire alert to capture moving objects. The performance of these background modeling techniques may be unreliable or error-prone due to variable lighting conditions experienced by the scene of interest in subsequent image frames, such as lighting changes caused by headlights moving through the scene, through intermittent interference of the train cars or other moving objects that temporarily occlude headlights or other light sources from frame to frame, and by changing environmental conditions such as rain, reflections, shadows, etc.

Large vehicles crossing the tracks that have similar size or appearance with the passing train engines or cars may also provide difficulties for automated processes to successfully distinguish the crossing vehicles from the train cars and engines. Some approaches build object classifiers directly to localize crossing vehicles or train cars in the scene, but these methods face scalability problems in the sense that they may not be able to cover all the possible automotive or train car types and models. Two-dimensional (2D) background modeling approaches are also limited and generally cannot reliably distinguish between trains and large vehicles, such as 18-wheeler trucks and/or buses.

Figure 1:
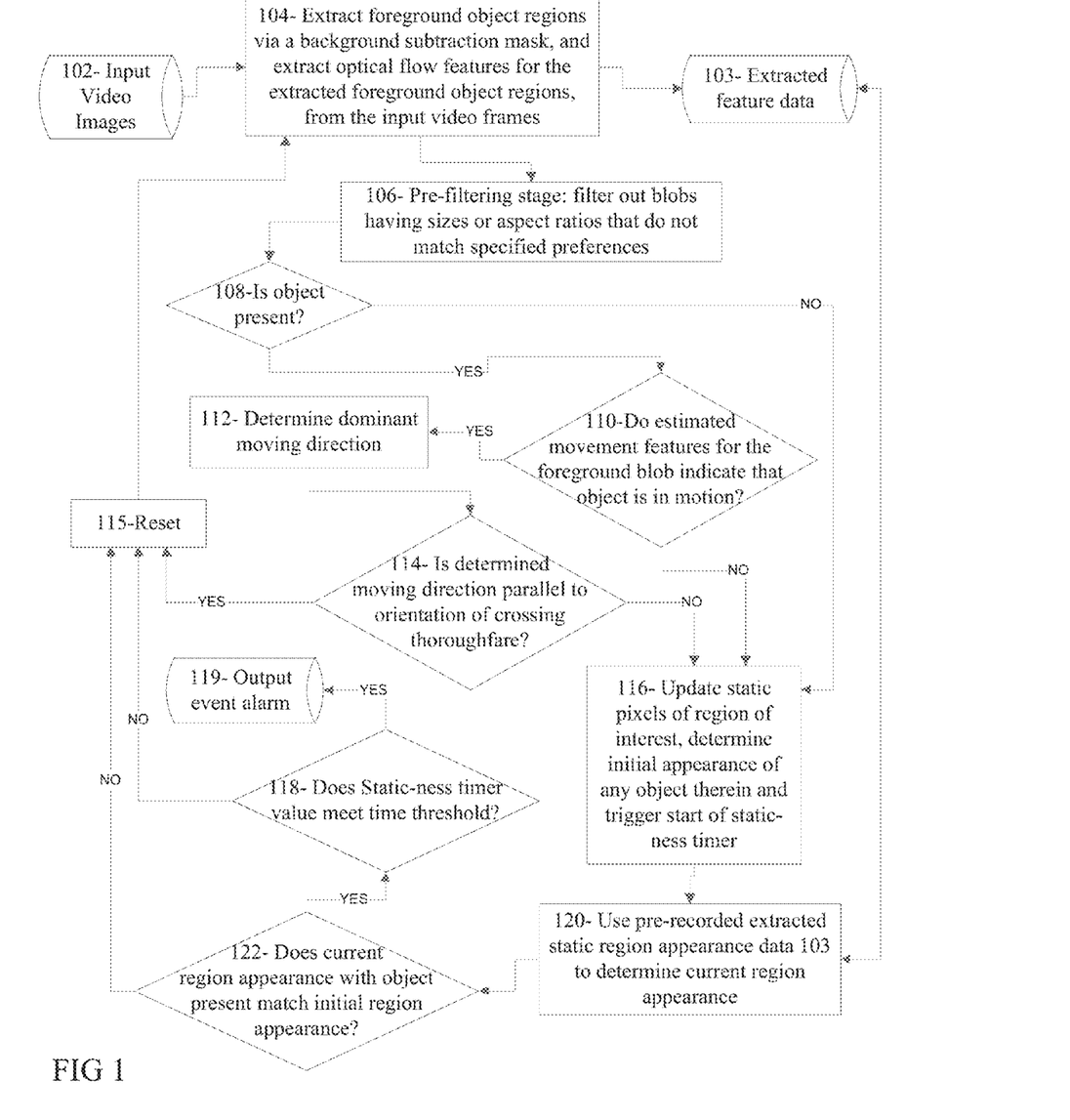
FIG. 1 is a block diagram illustration of an embodiment of the present invention that applies computer vision techniques to automatically detect the presence of static objects within a thoroughfare crossing.

FIG. 1 illustrates one embodiment of a method, system or process according to the present invention for applying computer vision techniques to automatically detect the presence of static objects within thoroughfare crossings. In response to input video image data 102 from a scene of a level-grade crossing of a first thoroughfare (for example, a road) by a second thoroughfare (for example, a railway) at 104, two types of features data are extracted and recorded into a tangible data storage medium 103 from the input video frames 102. First, foreground object image features are extracted via application of a background subtraction mask (sometimes referred to as a BGS mask); in some embodiments, this is determined based on a Gaussian Mixture Model method, though other methods may be practiced. This BGS mask indicates if the pixels inside the region of interest (ROI) of the scene belong to the background settings (and are thus marked by a zero) or as foreground objects (marked by one). This mask generally defines an object blob as a superset of an actual, underlying object, since it covers both the object and the object's shadow and some surrounding areas.

Figure 2:
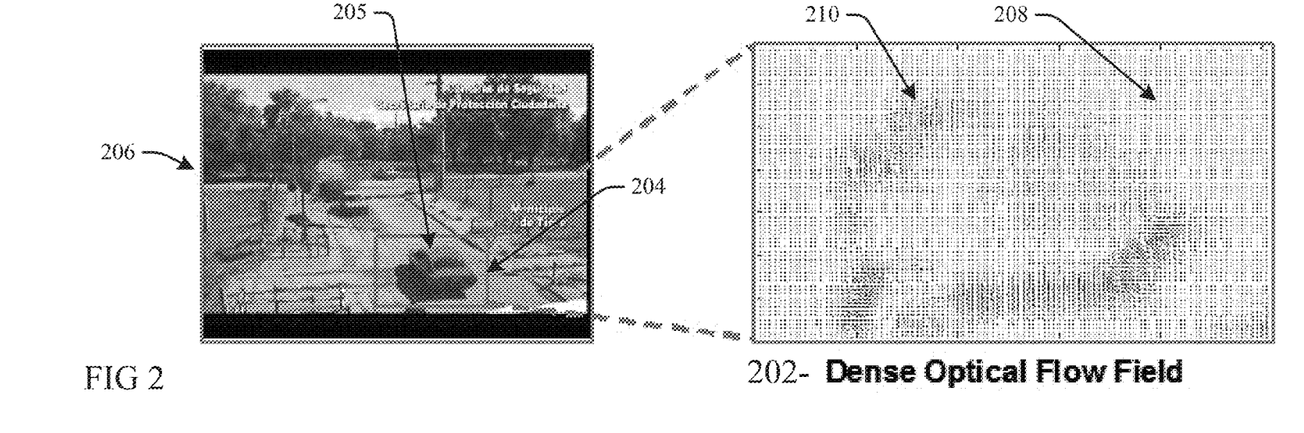
FIG. 2 is a photographic and graphic illustration depicting a computer vision technique analysis of image data from a thoroughfare crossing scene according to embodiments of the present invention.

The second feature extracted at 104 is the optical flow, which is a dense flow map for each pixel's movement between consecutive frames that is generally extracted only from those portions or regions of the input video image data that are co-extensive with or defined by the extracted foreground blob data. FIG. 2 illustrates one example of a dense optical flow field 202 extracted from the blob 204 defining the extent of a region of interest of the video frame image scene 206 that is indicated to comprise an underlying object (the vehicle 205). The optical flow of a pixel "p" may be generally denoted as a motion vector $(u\_p, v\_p)$, where "u_p" represents the x-component (or horizontal component) of "p"'s optical flow vector, and "v_p" usually represents the y-component (or vertical component) of the flow vector. If a pixel is stationary across consecutive frames, its optical flow will be (0,0), indicated by the light regions 208 in the dense optical flow field 202; if not stationary, then the $(u\_p, v\_p)$ will have non-zero values, indicated by the dark regions 210. Some embodiments use a Variational Flow method to compute the optical flows, though a variety of methods may be practiced to compute the optical flow features.

The foreground data features extracted by the BGS mask process at 104 generally define foreground blobs within the defined region which have size and aspect ratios. Blobs having sizes or aspect ratios that do not match the size or aspect ratio of static objects of interest are filtered out in a pre-filtering stage at 106 according to user's specified preferences, in one example removing blobs too small to match to a crossing pedestrian or vehicle within the scale of the video image scene, or too large to be a largest possible truck or bus, etc. Aspect ratio pre-filtering at 106 also removes blobs with strange shapes as anomalies, for example those with an aspect ratio greater than three, or having some other shape attribute that indicates that the object represented by the detected blob is unlikely to be a vehicle, pedestrian or other crossing object of interest. Thus, the pre-filtering step 106 removes spurious data and obvious erroneous detection inputs that might otherwise trigger false alarms in other prior art processes at any early point in data analysis, providing improved efficiencies.

Thus, if foreground blobs are detected that make it through the pre-filter at 106, then the process determines that an underlying object is present within the detected foreground blob and determines if the underlying object is in motion by estimating movement features of the foreground blob at 110. In the present embodiment, accumulative optical flow statistics are collected at 110 from frame data for the foreground blob in a histogram of the optical flow comprising a first bin representing the frequency of the pixels with zero optical flow magnitudes, representing the "static" area of the BGS foreground region comprising the object, and a plurality of other bins represent the frequencies of the pixels that possess optical flows pointing in each of their respective directions.

Figure 3:
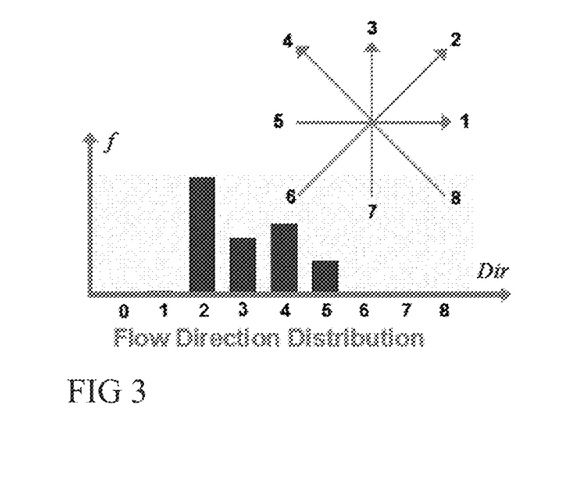
FIG. 3 is a graphic illustration of a directional histogram provided for corresponding, numbered directional arrows distributed about a 2D rotational orientation of possible travel of a detected object blob according to the present invention.

FIG. 3 illustrates one embodiment wherein directional histograms one through eight are provided for the corresponding, numbered directional arrows distributed in 45 degree increments about 2D rotational orientation of possible travel of the detected object blobs (the eight direction arrow each generally parallel to the surface that the object travels upon). It will be understood that other embodiments may utilize more or less directional histograms. Generally, the histogram data is collected at 110 over only the BGS mask area 204 (FIG. 2), in one aspect to minimize the noise introduced by the neighboring areas of the object. If the static area of the object is close to the total area contributed by the BGS foreground mask (about the same size or greater), then the object is declared as in a static state at 110, and otherwise (if the first-bin area is less than the total area of the other bins), the object represented by the foreground blob is considered as in motion.

Moving Objects.

If the object is determined to be in motion at 110, then its dominant moving direction is determined at 112. In one example, the dominant moving direction is computed as the arithmetic mean of all its optical flows, namely the directional bin frequencies of each of the different direction bins, which produces the average flow arrow determination 402 shown in FIG. 4. Other embodiments may use other techniques or weighting schemes. At 114 the determined dominant moving direction 402 is compared to the orientation of the orientation of crossing thoroughfare (in the present example, rail tracks 404) to determine whether or not the object is moving in a parallel direction. If 402 is parallel to 404, this would indicate that the underlying detected object is not crossing the thoroughfare (train tracks), but is instead likely an object travelling on the crossing thoroughfare, in effect a train car or other railway vehicle moving along the tracks. Thus, this object is not of concern in becoming static while crossing, and further consideration or analysis of this object may be terminated and the process reset at 115 and returned back to the start for further analysis of the input video images 102 at 104.

Figure 4:
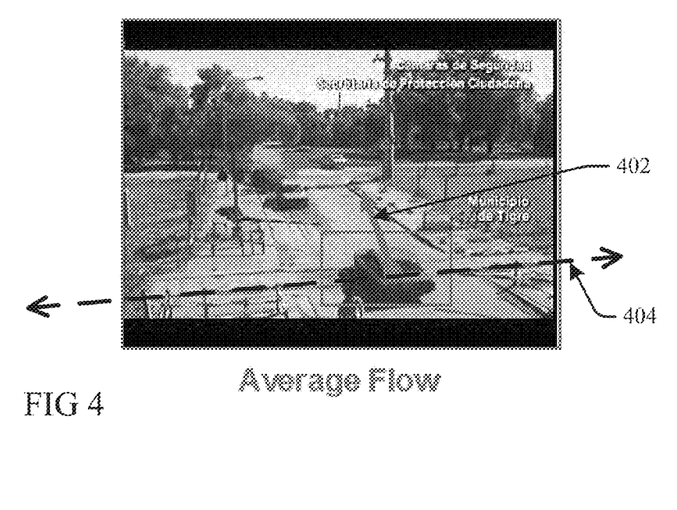
FIG. 4 is a photographic and graphic illustration depicting a computer vision technique analysis of image data from a thoroughfare crossing scene according to embodiments of the present invention.

If, however, it is determined at 114 that the target object's dominant moving direction 402 is not parallel to the train track orientation 404, then analysis of the blob continues at 116 in order to track the object and determine if the object remains moving (in order to progress through and thereby clears the crossing), or instead becomes stopped (static) in the level crossing area.

Static Objects.

At 116 the appearance of the region of interest of the foreground object is determined and a static-ness timer triggered to determine if the underlying object blob of the extracted foreground object image features remains static and fixed in the determined appearance of the foreground object region (more particularly, within the crossing area and thus likely to cause a collision hazard). This process is responsive to determining the presence of a static object in the crossing at 110, and may also be triggered when no object presence (moving or otherwise) is indicated at 108. In one implementation, a color histogram is used and applied at 116 over the object's static region. In addition, the static region of the object is updated at 116 to include the most recent static pixels. If this is a first observation of the object being static (after updating the pixel data), then a timer is started; otherwise, if a prior static observation of static-ness was made prior to the last (current) pixel data update, then an already-started timer is continued. The timer runs while the determined appearance of the foreground object region comprises the extracted foreground object image features, until the value of the timer meets a user-defined time threshold at 118, wherein the underlying object has remained static in the crossing area for at least the threshold time selected to indicate that corrective actions should be taken. Accordingly, an event is triggered at 119 to indicate a stopped/abandoned object in the level crossing region.

Blended Objects.

Figure 5:
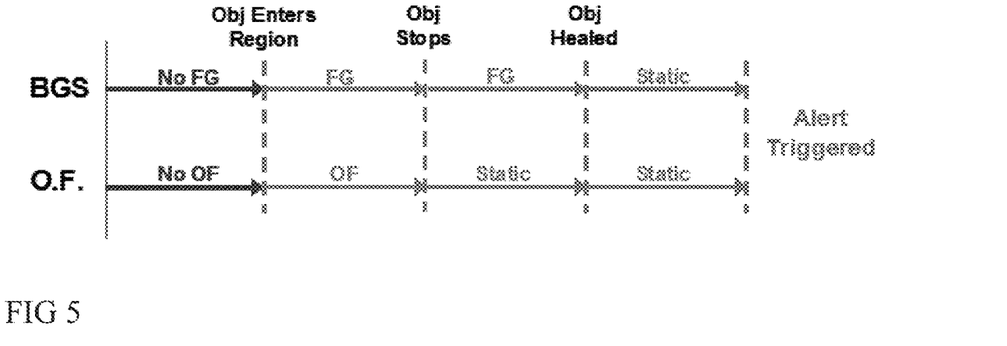
FIG. 5 is a graphic illustration of the relation of an object state to extracted data values according to the present invention.

"Blended objects" refer to those foreground objects that are static for a long time and thereby become determined as part of (or "healed into") the background by a BGS module, which is a common and inevitable problem of BGS methods and which may result in a false determination that there is not an object present in the crossing area. As illustrated in FIG. 5, before an object enters a scene in the video image data, outputs from a feature extraction process (for example, at 104 of FIG. 1) find no foreground object data ("no FG") and no significant or threshold levels of optical flow data ("no OF"). When the object enters the scene, then the process determines the presence of an object through both FG and OF data generated from the blob data at 104. If the object stops and remains static, then the OF data transitions to a static state, essentially "no OF", while the BGS process continues to "see" the object (FG data is still present). However, an object remaining static within the scene for a time sufficient to trigger the static-ness timer threshold at 118 may also become "healed" or learned into the background before the timer determination at 118 is satisfied and the event alarm triggered at 119. Under prior art approaches, if the FG data is healed into the background, then the extracted data no longer indicates the presence of the object at a point before the timer reaches the static-ness threshold, and thus the timer will stop running and not meet the threshold time, thereby failing to trigger the event alarm at 119.

Embodiments of the present invention address this problem by extracting pre-recorded static region appearance data and using the extracted data to compute a current region appearance of the image at 120 while the timer triggered at 118 is running. If these two appearances are similar (they match at 122 within some distance measure threshold) and the presence of a static object has been previously determined at 108, then the process determines that a foreground object within the initially determined appearance at 116 is still present even if the object data has been healed into the background in an intervening time period at the time of the current region appearance determination at 120. As shown in FIG. 5, the BGS data does not transition from FG to background, but to "static," which keeps the timer progressing to the event alarm trigger threshold even if the FG data would otherwise have healed into the background.

The steps of extracting the pre-recorded static region appearance data to determine the current region appearance of the image at 120, and matching the initial appearances at 122, may occur at any time or times while the initiated static-ness timer is running, including on an iterative or repetitive, periodic basis. By using the pre-recorded data 103 at 120 a foreground object determination in the initial appearance determination at 116 persists in the process beyond a healing point common in the prior art, so that the timer may continue to run at 118 and trigger an event alarm at 119 if satisfied, by using the current image determined at 120 as the continuation of the previous recorded static object.

Embodiments of the present invention thereby provide improved performance for reliably detecting stopped objects on railroad level crossings relative to prior art approaches that are based only on the background subtraction results. Embodiments may also be implemented in a variety of other thoroughfare crossing contexts, such as roadway intersections, highway on and off-ramps, and other areas wherein recognizing static objects in the expected or projected path of travel of other objects is useful.

The static-ness analysis according to the present invention provides evidence that a targeted object is not only a real foreground object, but also that it is actually being static on the level crossing or other area of concern. This is contrast with prior art approaches which detect foreground objects independent of any determination if the objects are in motion or not. Instead, the travelling direction of the objects helps the embodiments of the present invention to determine if the object is instead part of the thoroughfare crossed (for example, a passing train car traveling along the railroad track) or instead other vehicles, pedestrians, etc. that should be tracked in order to avoid collisions with the moving objects of the thoroughfare crossed. The static-ness and motion direction analyses can also effectively handle periodic headlight interferences and other changes in lighting and image data quality that may affect object determinations over the time period necessary to trigger a static object event determination, by computing current region appearance both from real-time and historic scene data and thereby preventing loss of object tracking through healing or other sudden loss of object presence detection.

Figure 6:
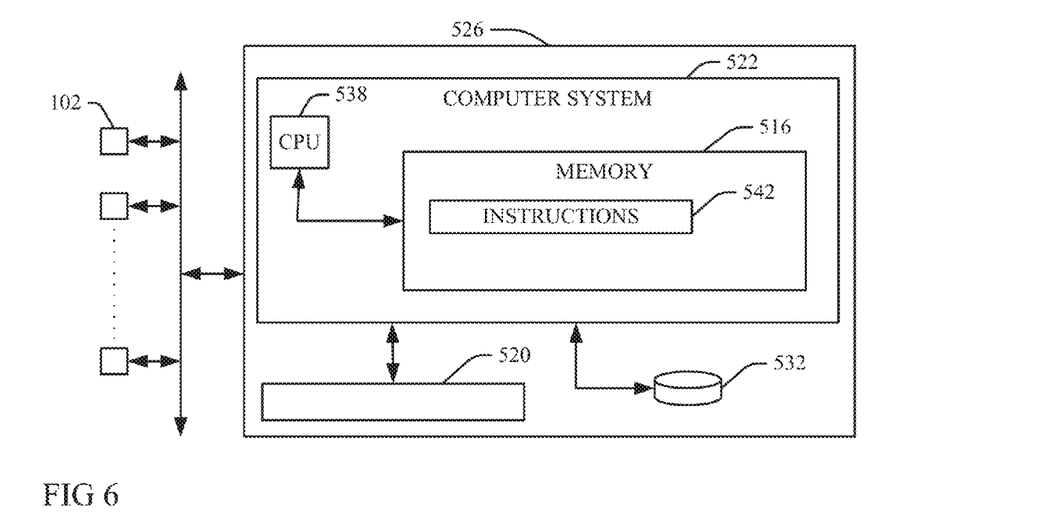
FIG. 6 is a block diagram illustration of a computer system implementation of an embodiment of the present invention.

Referring now to FIG. 6, an exemplary computerized implementation of an embodiment of the present invention includes a computer system or other programmable device 522 in communication with video data input devices 102 (cameras, hard drive, network ports, etc.) for providing video data input for applying computer vision techniques to automatically detect the presence of static objects within thoroughfare crossings as described above with respect to FIGS. 1-5. Instructions 542 reside within computer readable code in a computer readable memory 516, or in a computer readable storage system 532, or other tangible computer readable storage medium that is accessed through a computer network infrastructure 526 by a Central Processing Unit (CPU) 538. Thus, the instructions, when implemented by the processing unit 538, cause the processing unit 538 to perform computer vision technique analysis of image data for detecting the presence of static objects within thoroughfare crossings as described above.

Embodiments of the present invention may also perform process steps of the invention on a subscription, advertising, and/or fee basis. That is, a service provider could offer to integrate computer-readable program code into the computer system 522 to enable the computer system 522 to perform computer vision technique analysis of image data for detecting the presence of static objects within thoroughfare crossings as described above. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for applying computer vision techniques to automatically detect the presence of static objects within a first thoroughfare crossing of a second thoroughfare, the method comprising:

in response to input video image data from a scene of a level-grade crossing of a first thoroughfare by a second thoroughfare, a processing unit extracting and recording into a tangible data storage medium foreground object image features via application of a background subtraction mask, and optical flow image features from a region of the input video image data defined by the extracted foreground object image features;

the processing unit determining, by estimating movement features of the foreground object image features, whether an underlying object of the extracted foreground object image features is in motion or is static;

the processing unit determining a dominant moving direction of the underlying object as a function of the extracted optical flow image features if the estimated movement features indicate that the underlying object is in motion;

the processing unit resetting the process and not generating an event alarm if the determined dominant moving direction of the underlying object is parallel to an orientation of the second thoroughfare that is crossed by the first thoroughfare; and if the estimated movement features indicate that the underlying object is static, or that the object is in motion and the determined dominant moving direction of the underlying object is not parallel to the orientation of the second thoroughfare that is crossed by the first thoroughfare, the processing unit:

determining an initial appearance of the foreground object region;

starting and running a static-ness timer that runs while the foreground object region comprises the extracted foreground object image features;

generating the event alarm if the started static-ness timer reaches a threshold while the determined appearance of the foreground object region comprises the extracted foreground object image features; and wherein the event alarm indicates that a static object is blocking travel on the crossing second thoroughfare.

2. The method of claim 1, wherein the steps of the processing unit determining the appearance of the foreground object region and starting and running the static-ness timer further comprises:

extracting pre-recorded static region appearance data for the region of the input video image data defined by the extracted foreground object image features from the foreground object image features and optical flow image features recorded into the tangible data storage medium;

using the extracted pre-recorded static region appearance data to determine a current appearance for the region of the input video image data defined by the extracted foreground object image features; and keeping the started timer running if the extracted foreground object image features are learned into background while the timer is running and the current region appearance matches the initial region appearance within a distance measure threshold.

3. The method of claim 2, wherein the step of the processing unit estimating the movement features of the foreground object image features comprises:

collecting optical flow statistics from frame data for the foreground object image features in a histogram comprising a first bin accumulating a frequency of pixels with zero optical flow magnitudes that represents a static area of the underlying object, and a plurality of other bins that each accumulate frequencies of pixels that possess optical flows pointing in each of a plurality of different, respective directions;

determining that the underlying object of the extracted foreground object image features is static if an area of the foreground region comprising the object that is represented by the first bin accumulated frequencies is at least about the same as a total of the areas represented by the accumulated frequencies of the plurality of the other different, respective direction bins; and determining that the underlying object of the extracted foreground object image features is in motion if the foreground region area represented by the accumulated first bin frequencies is less than the total of the areas represented by the accumulated frequencies of the plurality of the other different, respective directions bins.

4. The method of claim 3, wherein the dominant moving direction of the underlying object is determined as an arithmetic mean of the accumulated frequencies of the plurality of the other different, respective direction bins.

5. The method of claim 4, wherein the determining the appearance of the region of the input video image data defined by the extracted foreground data comprises implementing and applying a color histogram over the area of the foreground region represented by the accumulated static frequencies of the first bin.

6. The method of claim 5, wherein the step of the processing unit extracting the foreground blob region object image features via application of the background subtraction mask comprises determining background subtraction mask features based on a Gaussian Mixture Model method.

7. The method of claim 5, wherein the processing unit extracting the optical flow image features comprises determining variational flow optical flow features for pixels within the region of the input video image data defined by the extracted foreground object image features.

8. The method of claim 5, further comprising, prior to the step of the processing unit determining whether the underlying object of the extracted foreground object image features is in motion or is static by estimating the movement features of the foreground object image features, if a foreground blob defined from the foreground object image features extracted by the background subtraction mask has a size or an aspect ratio that does not match a predetermined size or aspect ratio value:

filtering out the foreground object image features;
resetting the process; and
not generating the event alarm.

9. The method of claim 5, further comprising:

integrating computer-readable program code into a computer system comprising a processing unit, a computer readable memory and a computer readable tangible storage medium, wherein the computer readable program code is embodied on the computer readable tangible storage medium and comprises instructions that, when executed by the processing unit via the computer readable memory, cause the processing unit to perform the steps of extracting and recording into the tangible data storage medium the foreground object image features and the optical flow image features, determining whether the underlying object of the extracted foreground object image features is in motion or is static, determining the dominant moving direction of the underlying object in motion, resetting the process and not generating an event alarm if the determined dominant moving direction of the underlying object in motion is parallel to the orientation of the second thoroughfare that is crossed by the first thoroughfare, and determining the initial appearance of the foreground object region, starting and running the static-ness timer and generating the event alarm for the static underlying object and the object in motion having the determined dominant moving direction that is not parallel to the orientation of the second thoroughfare that is crossed by the first thoroughfare.

10. A system, comprising:

a processing unit in communication with a computer readable memory and a tangible computer-readable storage medium;

wherein the processing unit, when executing program instructions stored on the tangible computer-readable storage medium via the computer readable memory:

in response to input video image data from a scene of a level-grade crossing of a first thoroughfare by a second thoroughfare, extracts and records into a tangible data storage medium foreground object image features via application of a background subtraction mask, and optical flow image features from a region of the input video image data defined by the extracted foreground object image features;

determines, by estimating movement features of the foreground object image features, whether an underlying object of the extracted foreground object image features is in motion or is static;

determines a dominant moving direction of the underlying object as a function of the extracted optical flow image features if the estimated movement features indicate that the underlying object is in motion;

resets the process and does not generate an event alarm if the determined dominant moving direction of the underlying object is parallel to an orientation of the second thoroughfare that is crossed by the first thoroughfare; and if the estimated movement features indicate that the underlying object is static, or that the object is in motion and the determined dominant moving direction of the underlying object is not parallel to the orientation of the second thoroughfare:

determines an initial appearance of the foreground object region;

starts and runs a static-ness timer that runs while the foreground object region comprises the extracted foreground object image features; and generates the event alarm if the started static-ness timer reaches a threshold while the determined appearance of the foreground object region comprises the extracted foreground object image features; and wherein the event alarm indicates that a static object is blocking travel on the crossing second thoroughfare.

11. The system of claim 10, wherein the processing unit, when executing the program instructions stored on the computer-readable storage medium via the computer readable memory, determines the appearance of the foreground object region and starts and runs the static-ness timer by further:

extracting pre-recorded static region appearance data for the region of the input video image data defined by the extracted foreground object image features from the foreground object image features and optical flow image features recorded into the tangible data storage medium;

using the extracted pre-recorded static region appearance data to determine a current appearance for the region of the input video image data defined by the extracted foreground object image features; and keeping the started timer running if the extracted foreground object image features are learned into background while the timer is running and the current region appearance matches the initial region appearance within a distance measure threshold.

12. The system of claim 11, wherein the processing unit, when executing the program instructions stored on the computer-readable storage medium via the computer readable memory, further estimates the movement features of the foreground object image features by:

collecting accumulative optical flow statistics from frame data for the foreground object image features in a histogram comprising a first bin accumulating a frequency of pixels with zero optical flow magnitudes that represents a static area of the underlying object, and a plurality of other bins that each accumulate frequencies of pixels that possess optical flows pointing in each of a plurality of different, respective directions;

determining that the underlying object of the extracted foreground object image features is static if an area of the foreground region comprising the object that is represented by the first bin accumulated frequencies is at least about the same as a total of the areas represented by the accumulated frequencies of the plurality of the other different, respective direction bins; and determining that the underlying object of the extracted foreground object image features is in motion if the foreground region area represented by the first bin accumulated frequencies is less than the total of the areas represented by the accumulated frequencies of the plurality of the other different, respective direction bins.

13. The system of claim 12, wherein the processing unit, when executing the program instructions stored on the computer-readable storage medium via the computer readable memory, determines the dominant moving direction of the underlying object as an arithmetic mean of the accumulated frequencies of the plurality of the other different, respective direction bins.

14. The system of claim 13, wherein the processing unit, when executing the program instructions stored on the computer-readable storage medium via the computer readable memory, prior to determining whether the underlying object of the extracted foreground object image features is in motion or is static by estimating the movement features of the foreground object image features, if a foreground blob defined from the foreground object image features extracted by the background subtraction mask has a size or an aspect ratio that does not match a predetermined size or aspect ratio value, further:

filters out the foreground object image features;
resets the process; and
does not generate the event alarm.

15. The system of claim 14, wherein the processing unit, when executing the program instructions stored on the computer-readable storage medium via the computer readable memory, extracts the optical flow image features by determining variational flow optical flow features for pixels within the region of the input video image data defined by the extracted foreground object image features.

16. A computer program product, comprising:

a computer readable hardware storage device having computer readable program code embodied therewith, the computer readable program code comprising instructions for execution by a computer processing unit that cause the computer processing unit to:

in response to input video image data from a scene of a level-grade crossing of a first thoroughfare by a second thoroughfare, extract and record into a tangible data storage medium foreground object image features via application of a background subtraction mask, and optical flow image features from a region of the input video image data defined by the extracted foreground object image features;

determine, by estimating movement features of the foreground object image features, whether an underlying object of the extracted foreground object image features is in motion or is static;

determine a dominant moving direction of the underlying object as a function of the extracted optical flow image features if determined that the underlying object is in motion;

reset the process and not generate an event alarm if the determined dominant moving direction of the underlying object is parallel to an orientation of the second thoroughfare that is crossed by the first thoroughfare; and if determined that the underlying object is static, or that the object is in motion and the determined dominant moving direction of the underlying object is not parallel to the orientation of the second thoroughfare:
determine an initial appearance of the foreground object region;
start and run a static-ness timer that runs while the foreground object region comprises the extracted foreground object image features;
generate the event alarm if the started static-ness timer reaches a threshold while the determined appearance of the foreground object region comprises the extracted foreground object image features; and
wherein the event alarm indicates that a static object is blocking travel on the crossing second thoroughfare.

17. The computer program product of claim 16, wherein the computer readable program code instructions, for execution by the computer processing unit, further cause the computer processing unit to determine the appearance of the foreground object region and start and run the static-ness timer by:
extracting pre-recorded static region appearance data for the region of the input video image data defined by the extracted foreground object image features from the foreground object image features and optical flow image features recorded into the tangible data storage medium;
using the extracted pre-recorded static region appearance data to determine a current appearance for the region of the input video image data defined by the extracted foreground object image features; and
keeping the started timer running if the extracted foreground object image features are learned into background while the timer is running and the current region appearance matches the initial region appearance within a distance measure threshold.

18. The computer program product of claim 17, wherein the computer readable program code instructions for execution by the computer processing unit, further cause the computer processing unit to estimate the movement features of the foreground object image features by:
collecting accumulative optical flow statistics from frame data for the foreground object image features in a histogram comprising a first bin accumulating a frequency of pixels with zero optical flow magnitudes that represents a static area of the underlying object, and a plurality of other bins that each accumulate frequencies of pixels that possess optical flows pointing in each of a plurality of different, respective directions;
determining that the underlying object of the extracted foreground object image features is static if an area of the foreground region comprising the object that is represented by the first bin accumulated frequencies is at least about the same as a total of the areas represented by the accumulated frequencies of the plurality of the other different, respective direction bins; and
determining that the underlying object of the extracted foreground object image features is in motion if the foreground region area represented by the first bin accumulated frequencies is less than the total of the areas represented by the accumulated frequencies of the plurality of the other different, respective directions bins.

19. The computer program product of claim 18, wherein the computer readable program code instructions for execution by the computer processing unit, further cause the computer processing unit to determine the dominant moving direction of the underlying object as an arithmetic mean of the accumulated frequencies of the plurality of the other different, respective direction bins.

20. The computer program product of claim 19, wherein the computer readable program code instructions for execution by the computer processing unit, further cause the computer processing unit to, prior to determining whether the underlying object of the extracted foreground object image features is in motion or is static by estimating the movement features of the foreground object image features, if a foreground blob defined from the foreground object image features extracted by the background subtraction mask has a size or an aspect ratio that does not match a predetermined size or aspect ratio value:
filter out the foreground object image features;
reset the process; and
not generate the event alarm.

* * * * *